(12) United States Patent
Maple et al.

(10) Patent No.: US 9,367,620 B2
(45) Date of Patent: Jun. 14, 2016

(54) LOCAL CONTEXT SEARCH RESULTS IMPROVEMENTS

(71) Applicant: INTERNATIONAL BUSINESS MACHINES CORPORATION, Armonk, NY (US)

(72) Inventors: Elizabeth J. Maple, Basingstoke (GB); Richard W. Pilot, Southampton (GB); Martin A. Ross, Gosport (GB); Craig H. Stirling, Southampton (GB); Ian T. Stirling, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 14/049,766

(22) Filed: Oct. 9, 2013

(65) Prior Publication Data
US 2014/0129584 A1 May 8, 2014

(30) Foreign Application Priority Data

Nov. 5, 2012 (GB) .................................. 1219816.4

(51) Int. Cl.
G06F 17/30 (2006.01)
G06F 7/00 (2006.01)

(52) U.S. Cl.
CPC ................................ *G06F 17/30864* (2013.01)

(58) Field of Classification Search
CPC ................................................ G06F 17/30864
USPC ......................................................... 707/760
See application file for complete search history.

(56) References Cited

U.S. PATENT DOCUMENTS

| | | | |
|---|---|---|---|
| 6,615,172 B1 | 9/2003 | Bennett et al. | |
| 7,698,344 B2 | 4/2010 | Sareen et al. | |
| 7,873,654 B2 | 1/2011 | Bernard | |
| 8,516,308 B1* | 8/2013 | Gill | ......... H04L 67/34 714/26 |
| 8,788,944 B1* | 7/2014 | Gill | ......... G06F 8/61 715/744 |
| 9,111,248 B2* | 8/2015 | Makhija | ............ G06F 17/30654 |
| 2005/0131892 A1* | 6/2005 | Knott | ................ G06F 17/30873 707/999.005 |
| 2007/0192085 A1* | 8/2007 | Roulland et al. | ................... 704/9 |
| 2008/0133504 A1* | 6/2008 | Messer et al. | ..................... 707/5 |
| 2008/0250010 A1 | 10/2008 | Rathod et al. | |

(Continued)

OTHER PUBLICATIONS

GB Patent Application No. 1219816.4—Search Report Mailed Mar. 28, 2013.

(Continued)

*Primary Examiner* — Pavan Mamillapalli
(74) *Attorney, Agent, or Firm* — Law Office of Jim Boice

(57) ABSTRACT

A method, system, and/or computer program product handles a query generated by a user of one of multiple local network devices that are coupled to a network. Multiple system queries are autonomously issued, by a computer that is coupled to the network, requesting states of the local network devices. Query statements, responsive to the system queries and being sent to a wide area network search engine, are intercepted. A natural language query, which is a logical query that is answered by one of the multiple query statements, is generated from one of the multiple query statements. An unstructured query, from a user, about a state of a particular device is received. The unstructured query from the user is compared with the natural language query in order to determine if a match between the query from the user with the natural language query exceeds a predetermined threshold value.

20 Claims, 21 Drawing Sheets

(56) References Cited

U.S. PATENT DOCUMENTS

| | | | |
|---|---|---|---|
| 2009/0132969 A1* | 5/2009 | Mayer | G06F 17/30587 715/862 |
| 2009/0248529 A1 | 10/2009 | Dhanapal et al. | |
| 2010/0293178 A1 | 11/2010 | Govani et al. | |
| 2011/0004462 A1* | 1/2011 | Houghton | G10L 15/183 704/9 |
| 2012/0005198 A1 | 1/2012 | Pontier et al. | |
| 2012/0233640 A1* | 9/2012 | Odryna | H02N 21/4828 725/45 |
| 2013/0278811 A1* | 10/2013 | Kristensson | H04N 5/23212 348/345 |
| 2014/0358882 A1* | 12/2014 | Diab | G06F 17/30867 707/707 |

OTHER PUBLICATIONS

Anonymous, "Is Apple 'Siri'-Ous About Search?" Barclays Capital, Google, Inc., March 9, 2012, pp. 1-13.

P. Cimiano et al, "Orakel: A Portable Natural Language Interface to Knowledge Bases", Mar. 1, 2007, pp. 1-.

Anonymous, "Siri. Your Wish Is Its Command." apple.com, Retrieved October 9, 2013, pp. 1-3.

* cited by examiner

Repository 400

Network Device Model 402

| Device | Network | Address |
|---|---|---|
| blu-ray player | Wifi | A1 |
| Printer | Bluetooth | A2 |
| Washing Machine | USB | A3 |

Query Confidence Cache 410

| Query | Confidence |
|---|---|
| | |
| | |

Result Model Cache 404

| | Natural Language Queries | Device | Natural Langauge Results | Generic Results |
|---|---|---|---|---|
| Q1 | What is the video codec of my blu-ray player? | Blu-ray player | The video codec of your blu-ray player is Xvid | Codec:Xvid |
| Q2 | What is the firmware version of my printer? | Printer | The firmware of your printer is 16.1 | Firmware: 16.1 |
| Q3 | What is the setting on my washing machine for a cotton wash? | Washing Machine | The cotton wash setting on your washing machine is 1 | Cotton Wash: Wash setting 1 |

Query Register 406: What is the codec version for my blu-ray machine?

Confidence Threshold Register 408: 60%

Figure 8G

Repository 400

Network Device Model 402

| Device | Network | Address |
|---|---|---|
| blu-ray player | Wifi | A1 |
| Printer | Bluetooth | A2 |
| Washing Machine | USB | A3 |

Query Confidence Cache 410

| Query | Confidence |
|---|---|
| Q1 | 90% |
| Q2 | 20% |
| Q3 | 10% |

Result Model Cache 404

| | Natural Language Queries | Device | Natural Langauge Results | Generic Results |
|---|---|---|---|---|
| Q1 | What is the video codec of my blu-ray player? | Blu-ray player | The video codec of your blu-ray player is Xvid | Codec:Xvid |
| Q2 | What is the firmware version of my printer? | Printer | The firmware of your printer is 16.1 | Firmware: 16.1 |
| Q3 | What is the setting on my washing machine for a cotton wash? | Washing Machine | The cotton wash setting on your washing machine is 1 | Cotton Wash: Wash setting 1 |

Query Register 406: What is the codec version for my blu-ray machine?

Confidence Threshold Register 408: 60%

Figure 8H

LOCAL CONTEXT SEARCH RESULTS IMPROVEMENTS

This application is based on and claims the benefit of priority from United Kingdom (GB) Patent Application 1219816.4, filed on Nov. 5, 2012, and herein incorporated by reference in its entirety.

BACKGROUND

This invention relates to a method and apparatus for improving local context search results. In particular, this invention relates to a method and apparatus for improving search results from remote and locally connected searchable devices.

A common Internet search request is a query for a technical specification of a product. This type of search request sometimes does not yield the desired results, perhaps returning links from automated price comparison website or poorly written technical reviews. There are a number of problems with this type of search request. First there is time, effort and bandwidth costs as the user does not immediately receive the answer they need and must spend additional effort to get the desired response. Secondly, the information returned from such results is likely to be unreliable or simply does not answer the question the user posed.

In a known client device, a natural language search statement is translated into a machine search instruction by the client device destined for one of a number of search engines. For example, the machine search instruction can comprise a command for a connected search engine to report back with the weather for that week or a query for a different search engine to return a firmware version. Such a translation works when the client device has been pre-configured for a precise search instruction type for a precise search engine but does not work if the statement is not of a configured type.

SUMMARY

A method, system, and/or computer program product handles a query generated by a user of one of multiple local network devices that are coupled to a network. Multiple system queries are autonomously issued, by a computer that is coupled to the network, requesting states of the local network devices. Query statements, responsive to the system queries and being sent to a wide area network search engine, are intercepted. A natural language query, which is a logical query that is answered by one of the multiple query statements, is generated from one of the multiple query statements. An unstructured query, from a user, about a state of a particular device is received. The unstructured query from the user is compared with the natural language query in order to determine if a match between the query from the user with the natural language query exceeds a predetermined threshold value.

BRIEF DESCRIPTION OF THE SEVERAL VIEWS OF THE DRAWINGS

Preferred embodiments of the present invention will now be described, by way of example only, with reference to the following drawings in which:

FIGS. 8A to 8H are a series of state diagrams showing the change of state of the memory map during an example operation of the preferred embodiment.

DETAILED DESCRIPTION

Figure 1:
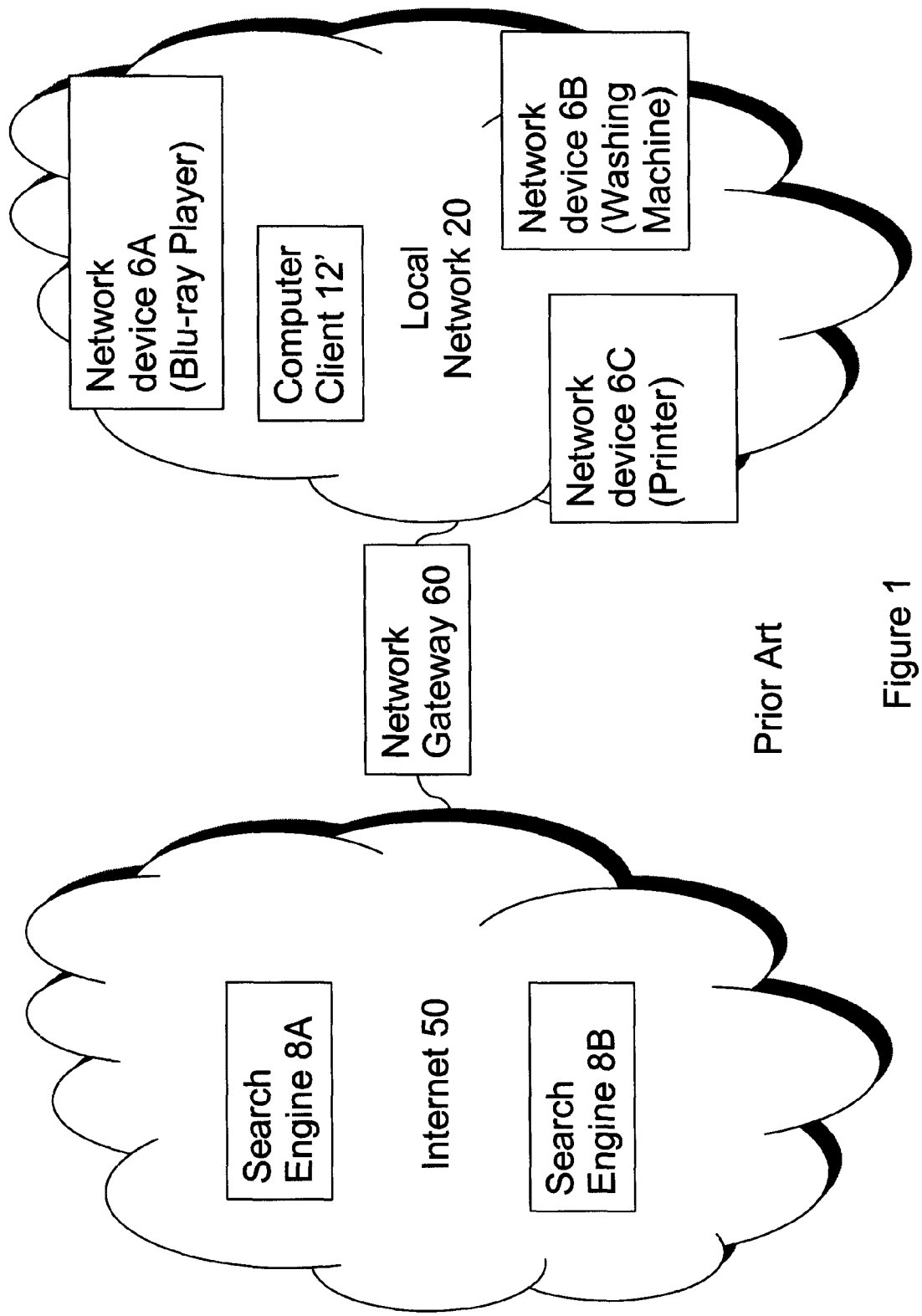
FIG. 1 is a network diagram of a known configuration of devices and search engines.

Referring to FIG. 1, a typical example configuration of clients, devices and servers within a local network 20 and the Internet 50 is shown. Local network 20 comprises: a computer client 12' and network devices 6A, 6B, and 6C (for example: a Blu-ray recorder; a washing machine and a printer). The Internet 50 comprises a very large number of computer devices but for the purposes of this embodiment only search engine 8A and search engine 8B are considered. The local network 20 and the Internet 50 are connected via network gateway 60. In the prior art, a typical client computer 12' with an Internet browser might make a search request of one of the search engines 8A or 8B. In the preferred embodiment of the invention, computer client 12 as described with respect to FIG. 2 replaces prior art computer client 12'.

Figure 2:
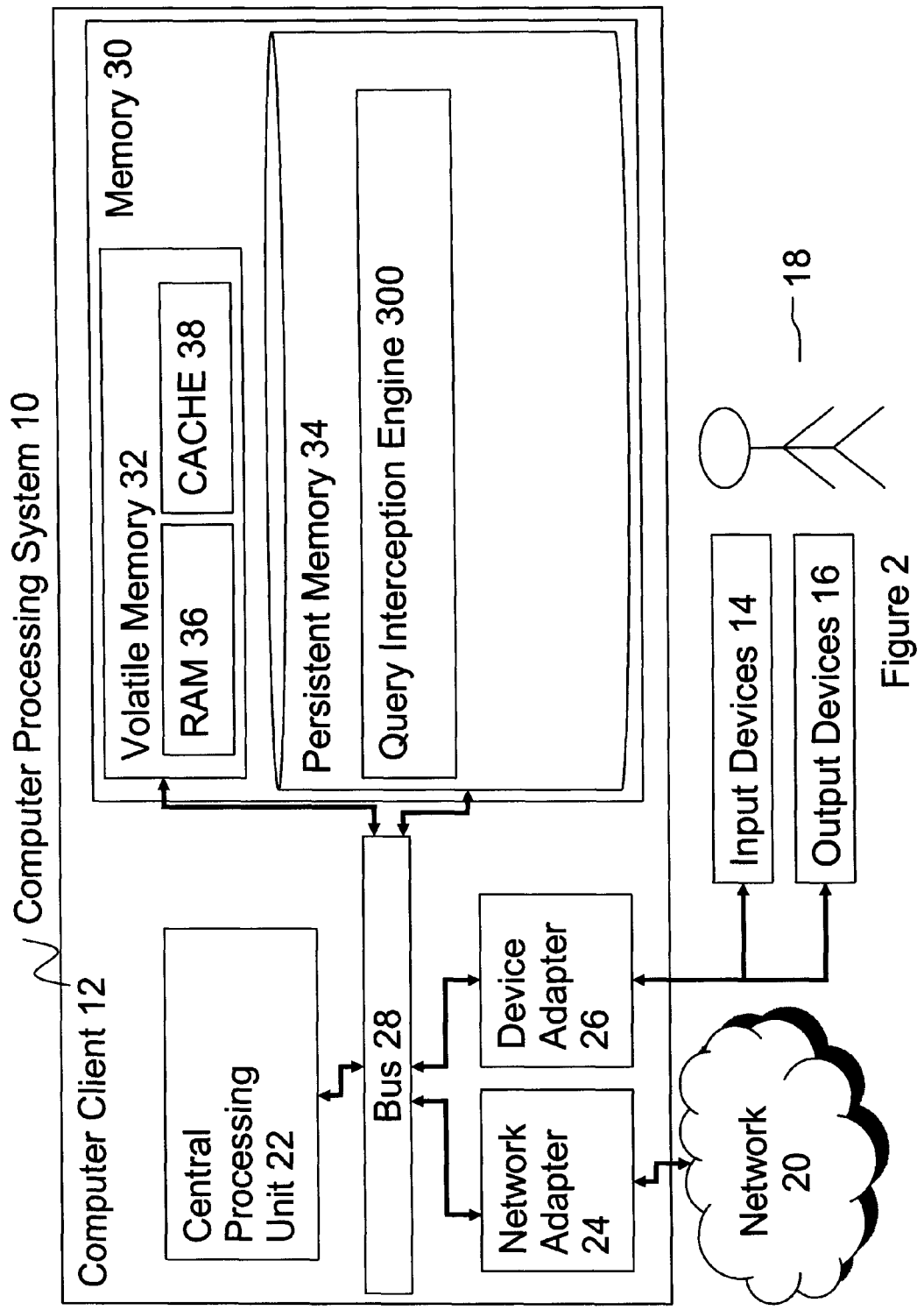
FIG. 2 is a deployment diagram of the preferred embodiment in a computer processing system.

Referring to FIG. 2, the deployment of a preferred embodiment in computer processing system 10 is described. Computer processing system 10 is operational with numerous other general purpose or special purpose computing system environments or configurations. Examples of well-known computing processing systems, environments, and/or configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer processing system 10 may be described in the general context of computer system-executable instructions, such as program modules, being executed by a computer processor. Generally, program modules may include routines, programs, objects, components, logic, and data structures that perform particular tasks or implement particular abstract data types.

Computer processing system 10 may be embodied in distributed cloud computing environments where tasks are performed by remote processing devices that are linked through a communications network. In a distributed cloud computing environment, program modules may be located in both local and remote computer system storage media including memory storage devices.

Computer processing system 10 comprises: general-purpose computer client 12 and one or more input devices 14 and output devices 16 directly attached to computer client 12. Computer processing system 10 is connected to a network 20. Computer processing system communicates with a user 18 using input devices 14 and output devices 16. Input devices 14 include one or more of: a keyboard, a scanner, a mouse, trackball or another pointing device. Output devices 16 include one or more of a display or a printer. Computer processing system communicates with network devices (not shown) over network 20. Network 20 can be a local area network (LAN). Further networks such as the Internet or wide area network (WAN) connect directly or indirectly through the LAN.

Computer client 12 comprises the following components: central processing unit (CPU) 22; network adapter 24; device adapter 26; bus 28 and memory 30.

CPU 22 loads machine instructions from memory 30 and performs machine operations in response to the instructions. Such machine operations include: increment or decrement a value in register (not shown); transfer a value from memory 30 to a register or vice versa; take instructions from a different location in memory if a condition is true or false (also known as a conditional branch instruction); and add or subtract the values in two different registers and put the result in another register. A typical CPU can perform many different machine operations. A set of machine instructions is called a machine code program, the machine instructions are written in a machine code language which is referred to a low level language.

A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between the computer client 12 and network devices.

Device adapter 26 is connected to bus 28 and input devices 14 and output devices 16 for enabling communication between computer client 12 and input devices 14 and output devices 16.

Bus 28 couples together CPU 22, network adapter 24, device adapter 26 and memory 30. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Generally volatile memory is used because it is faster and generally persistent memory is used because it will hold data without power.

Computer processing system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

In the preferred embodiment, the set of program modules configured to carry out the functions of the embodiments comprise query interception engine 300. Further program modules that support the preferred embodiment but are not shown include firmware, boot strap program, operating system, and support applications. Each of the operating system, support applications, other program modules, and program data or some combination thereof, may include an implementation of a networking environment.

Computer processing system 10 communicates with other device over at least one network 20 (such as a local area network (LAN) via network adapter 24. Network adapter 24 communicates with the other components of computer processing system 10 via bus 18. It should be understood that although not shown, other hardware and/or software components could be used in conjunction with computer processing system 10. Examples, include, but are not limited to: microcode, device drivers, redundant processing units, external disk drive arrays, redundant array of independent disks (RAID), tape drives, and data archival storage systems.

Figure 3:
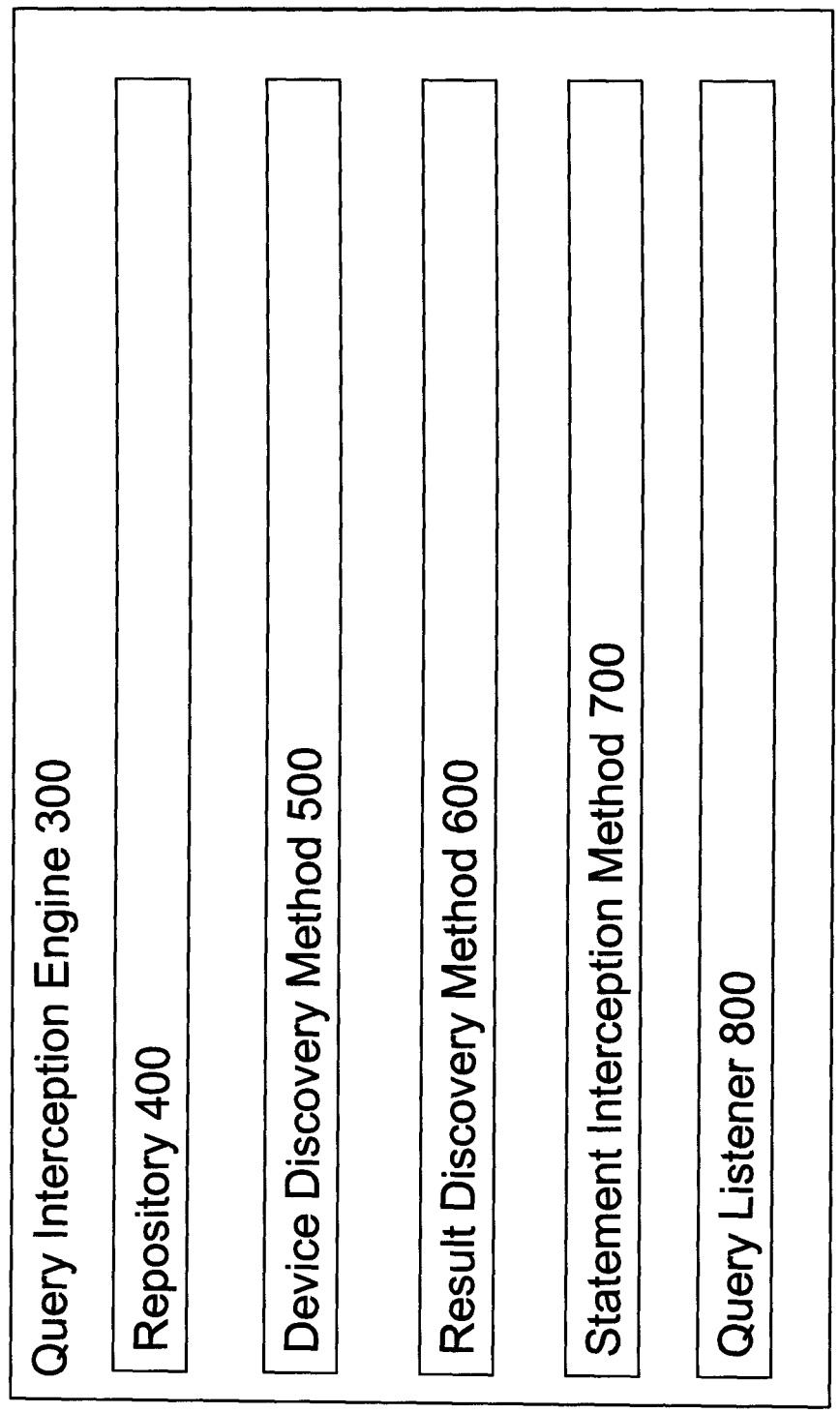
FIG. 3 is a component diagram of the preferred embodiment.

Referring to FIG. 3, query interception engine 300 comprises: repository 400; device discovery method 500; result discovery method 600; statement interception method 700; and query listener 800.

Repository 400 is for storing data used and acquired by and from device discovery method 500; result discovery method 600; and statement interception method 700. Repository 400 is described in more detail below.

Device discovery method 500 is for discovering devices connected in a local context to the client computer 12 and populates repository 500 with such discovered devices. Local context is used to describe external devices that are associated with the computer client 12. The preferred embodiment discovers devices that are associated in a local network via Ethernet connections, wireless connections and device adapter 26 connections. However, other embodiments are envisaged where devices on an enterprise network or on the Internet are associated with the client device and ready for discovery. Device discovery method 500 is described in more detail below with respect to FIG. 5.

Result discovery method 600 is for discovering possible results from discovered devices and populates repository 400 with such possible results. Result discovery method 600 is described in more detail below.

Statement interception method 700 is for receiving an intercepted search performed on the client computer 12 and for matching the statement with the discovered possible results in the repository 400. Statement interception method 700 is described in more detail below.

Query Listener 800 is for intercepting the search on the computer client 12 and sending to statement interception method 700.

Figure 4:
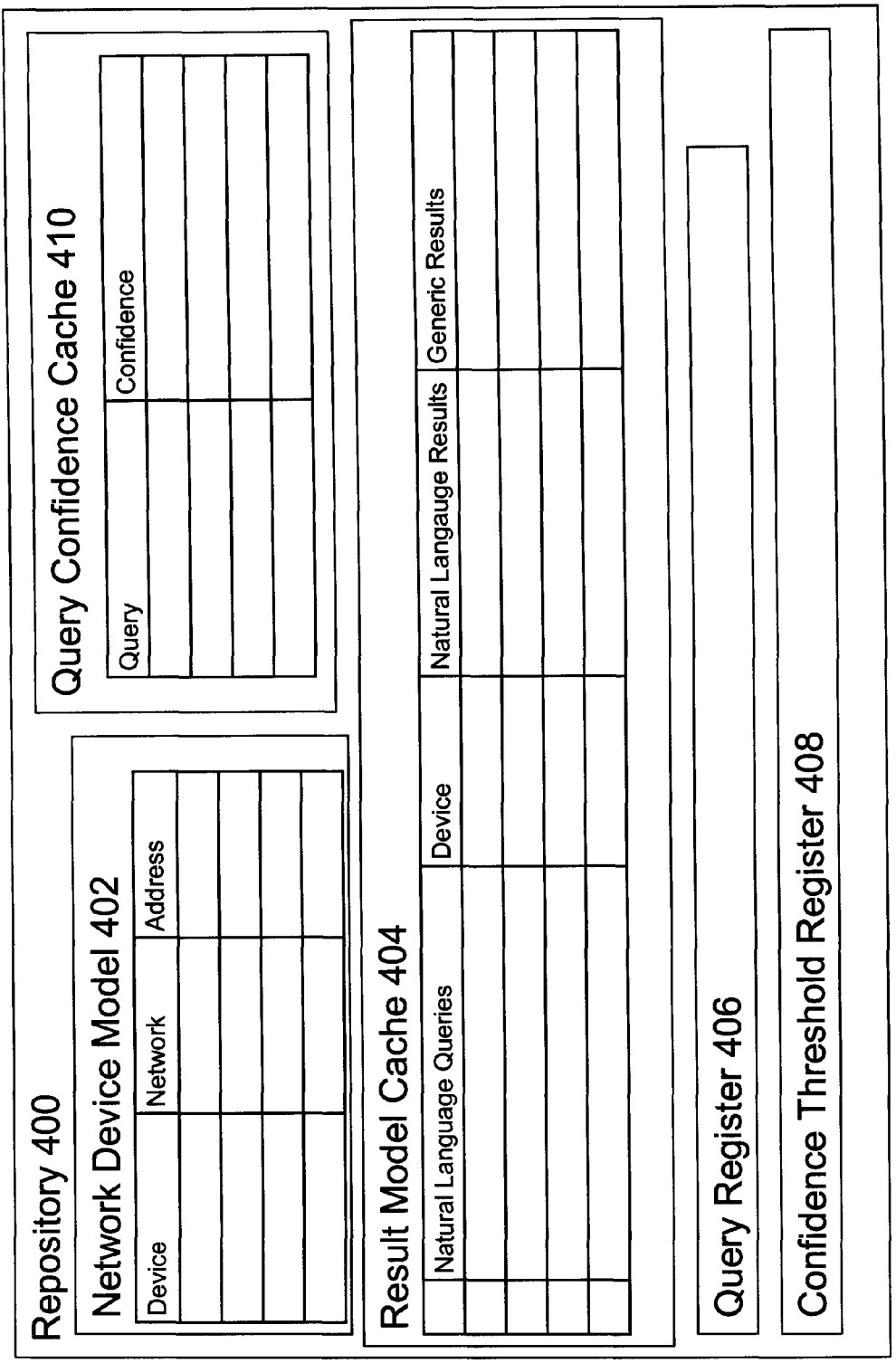
FIG. 4 is an empty memory map of the preferred embodiment.

Referring to FIG. 4, repository 400 comprises the following data structures: network device model 402; result model cache 404; query register 406; confidence threshold register 408 and query confidence cache 410.

Network device model 402 comprises data records for each device discovered by device discovery method 500. Each record comprises: device name; device network; and network address. In FIG. 4 network device model is depicted by a table with three columns and a set of empty rows. The three columns are labeled: device; network; and address.

Result model cache 404 holds records describing possible results. Each possible result record comprising: a natural language query that may be used to acquire a possible result; a device that the result may come from; a natural language result and a possible result as raw data.

Query register 406 is a register for holding the query statement entered by a user.

Confidence threshold register 408 is a register for holding the threshold value used as a reference for accepting results as close results or not.

Query confidence cache 410 is a memory space for holding confidence value calculations as to whether a natural language query is close to the query entered by the user.

Figure 5:
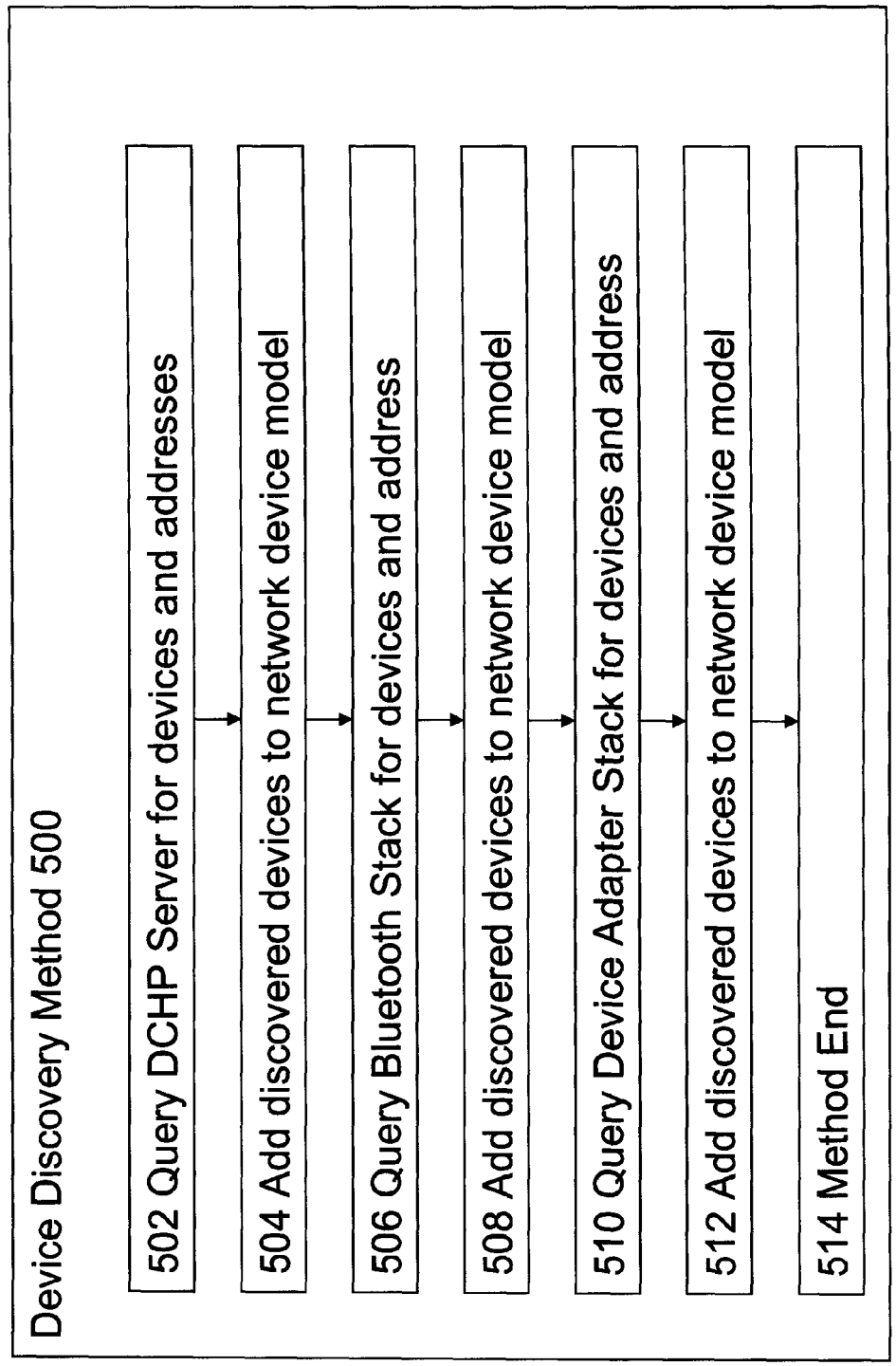
FIG. 5 is a diagram of a device discovery method of the preferred embodiment.

Referring to FIG. 5, device discovery method 500 comprises logical process steps 502 to 514.

Step 502 is for querying a dynamic host configuration protocol (DHCP) server for devices and addresses.

Step 504 is for adding discovered DHCP devices, addresses and network type to network device model 402.

Step 506 is for querying a Bluetooth stack for devices and address. In the preferred embodiment a Bluetooth network is used for wireless personal area devices but other embodiments using a proprietary wireless network are envisaged.

Step 508 is for adding discovered Bluetooth devices, addresses and network type to network device model 402.

Step 510 is for querying a device adapter stack for devices that are connected to the client via device adapter 26.

Step 512 is for adding discovered devices, address and network type to network device model 402.

Step 514 is the end of method 500.

Figure 6:
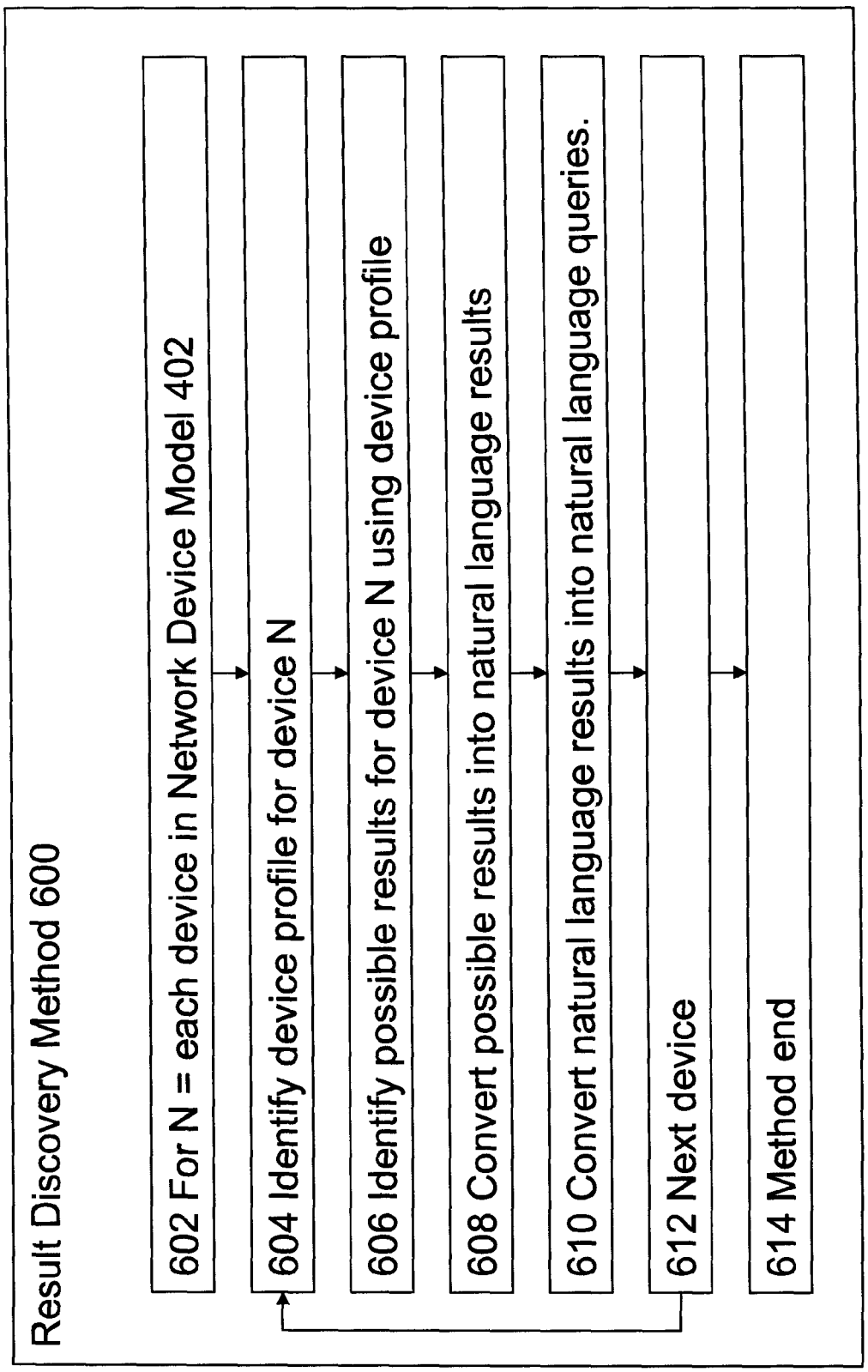
FIG. 6 is a flow diagram of a result discovery method of the preferred embodiment.

Referring to FIG. 6, result discovery method 600 of the preferred embodiment comprises logical process steps 602 to 614.

Step 602 defines a loop N for each device in network device model 402.

Step 604 is for identifying a device profile for device N that contains the network protocol needed to query the device.

Step 606 is for identifying possible results for device N using the network protocol and for updating the result model cache 404.

Step 608 is for converting possible results into natural language results and for updating the result model cache 404.

Step 610 is for converting natural language results into natural language queries and for updating the result model cache 404.

Step 612 loops back to step 604 to process a next device if there is one.

Step 614 is the end of method 600.

Figure 7:
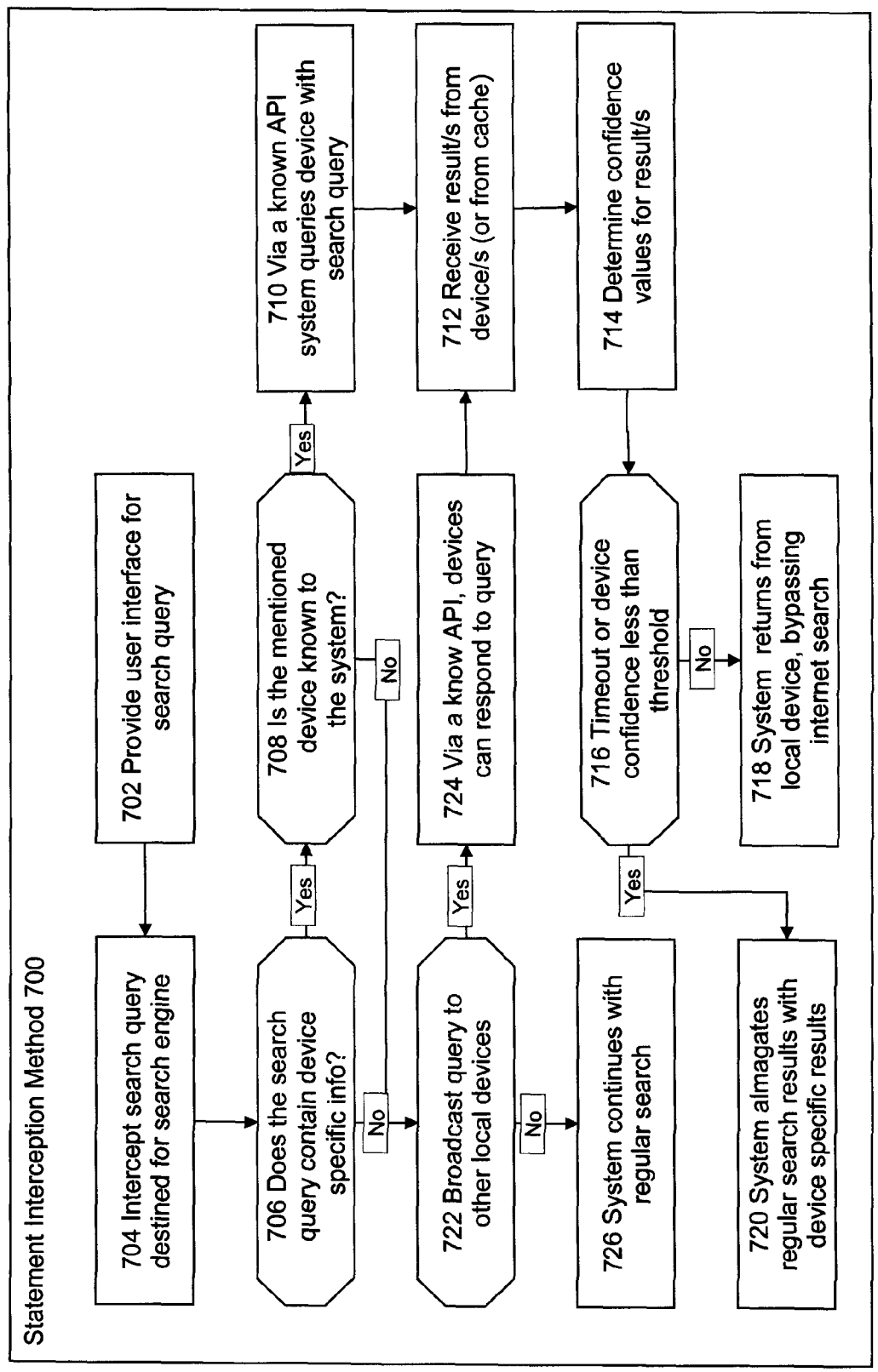
FIG. 7 is a flow diagram of a statement interception method of the preferred embodiment.

Referring to FIG. 7, statement interception method 700 of the preferred embodiment comprises steps 702 to 726.

Step 702 is for providing a user interface for a search query.

Step 704 is for initiating and waiting for query listener 800 to intercept a search query destined for an Internet search engine. When an intercept occurs and a search query is determined then the process continues at step 706.

Step 706 is for determining if the search query contains specific device information. If yes then processing moves to step 708 else, processing moves to step 722.

Step 708 is for determining if the specific device is known to the system. A check of network device model 402 is made and the most likely devices selected based on the similarity of the device in the query and the search terms in the query. If a match is made then processing continues at step 710 else processing continues at step 722.

Step 710 is for querying the device with the search query using a specific device protocol. This step may query the device directly or indirectly using the result model cache 404.

Step 712 is for receiving the results from the device or result model cache 404.

Step 714 is for determining a confidence value of the results based on the closeness of the user query to a determined query for the possible device results.

Step 716 is for checking timeouts and confidence values. If the confidence value is equal to or more than the threshold value (or there is an Internet query timeout) then processing continues at step 718 else step 720. Step 720 is arrived at: if the device query times out; or if the confidence value is less than threshold value.

Step 718 is for returning the query result from the local device and bypassing the Internet search. This is an end of method 700.

Step 720 is for returning amalgamated Internet search results and device specific results (if any). This is an end of method 700.

Step 722 is for determining if useful results might be obtained by broadcasting the query to all known local devices. This might be a default determination regardless of the search query or might occur if the search query has more than a threshold similarity to device references. If the query is broadcast then step 724 else step 726.

Step 724 is for collecting the results from devices that have received the broadcast and determining which results are the most likely matches to the search query. The most likely results are passed on to step 712.

Step 726 is for continuing with a regular Internet search without a device query. This is an end of method 700.

Referring to FIGS. 8A to 8H, changes of state of the memory map during an example operation of the preferred embodiment are described.

Figure 8A:
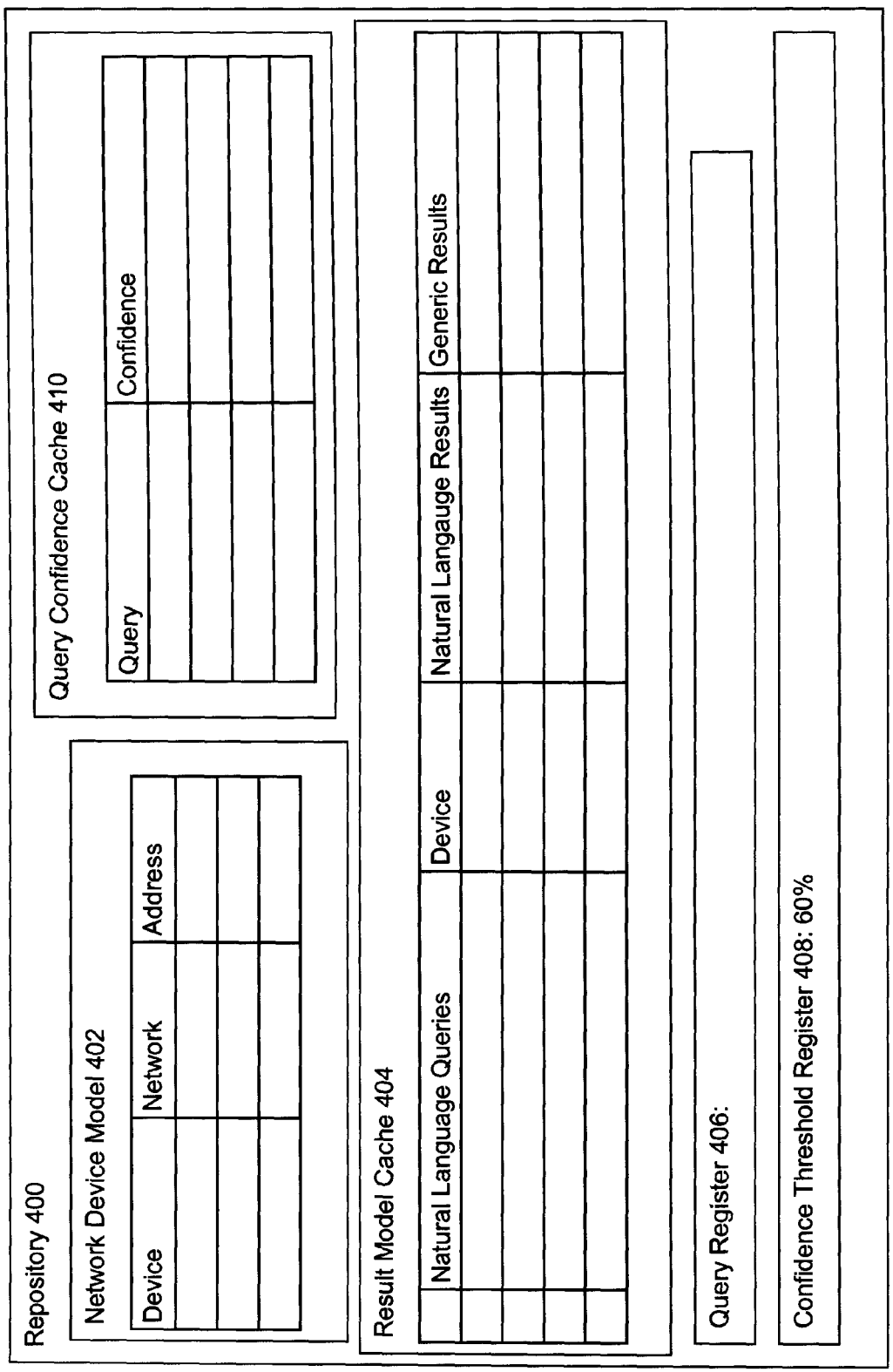

Referring to FIG. 8A, confidence threshold register 408 is loaded with a 60% value as determined by a system administrator.

Figure 8B:
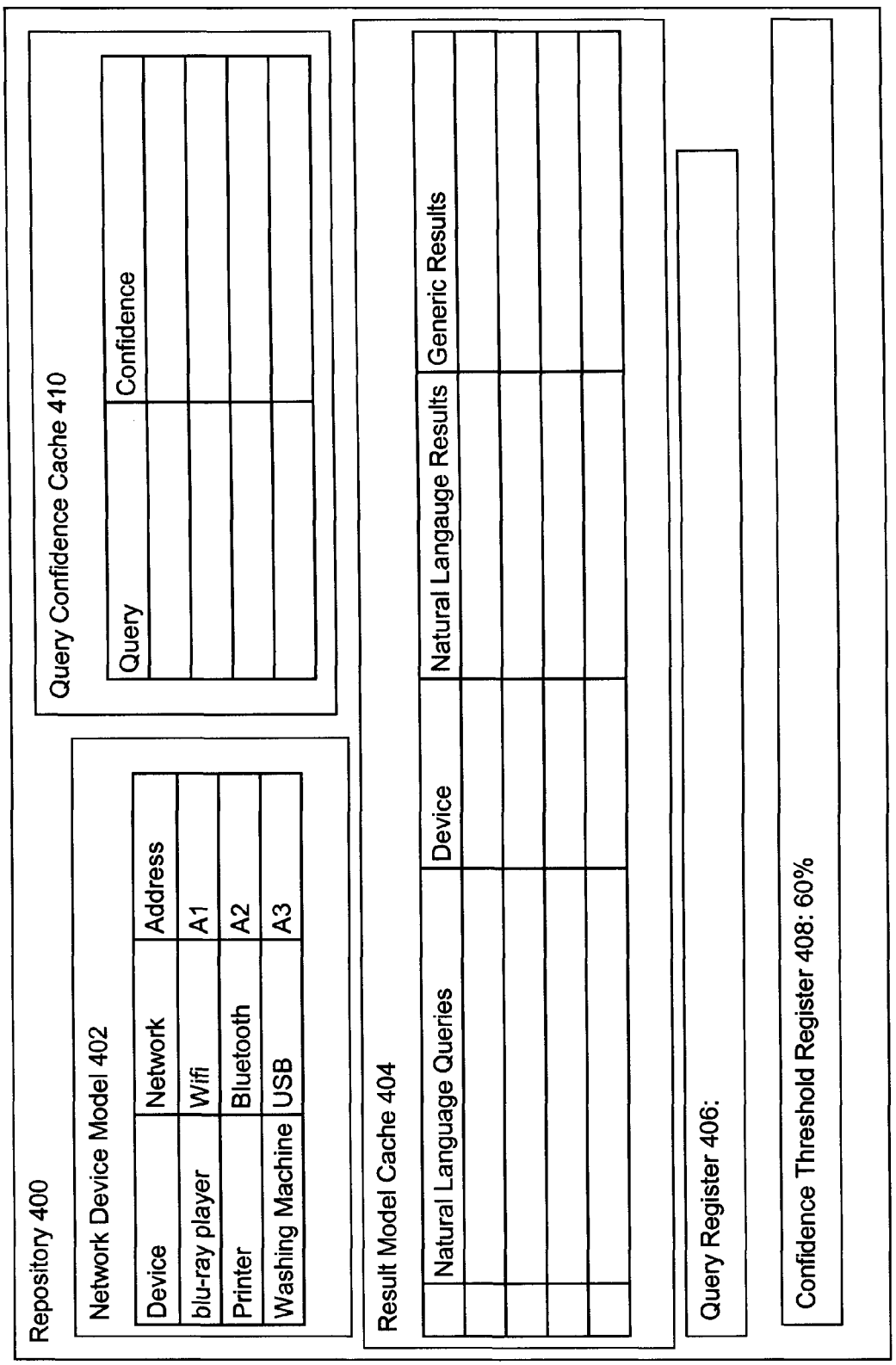

Referring to FIG. 8B, device discovery method 500 is initiated and populates the network device model 402 with discovered network devices: Blu-ray player (6A); printer (6B); and washing machine (6C). Blu-ray player 6A is discovered on a Wi-Fi network at address A1. Printer 6B is discovered on a Bluetooth network at address A2. Washing machine 6C is discovered attached by a universal serial bus (USB) at address A3.

Figure 8C:
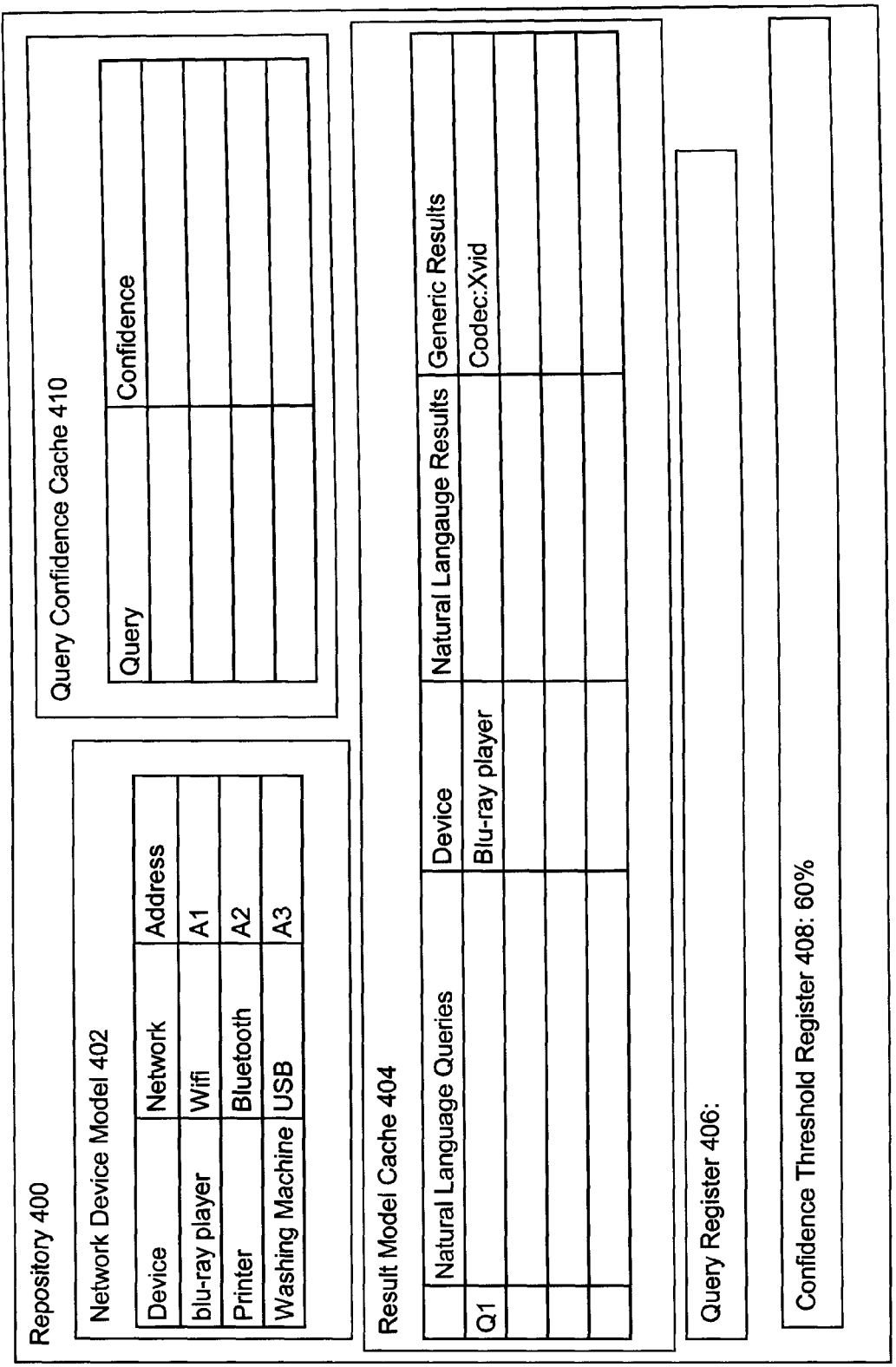

Referring to FIG. 8C, result discovery method 600 is initiated and starts to populate result model cache 404. The first device queried is the Blu-ray player and a generic query result of "codec:Xvid" is returned for query Q1.

Figure 8D:
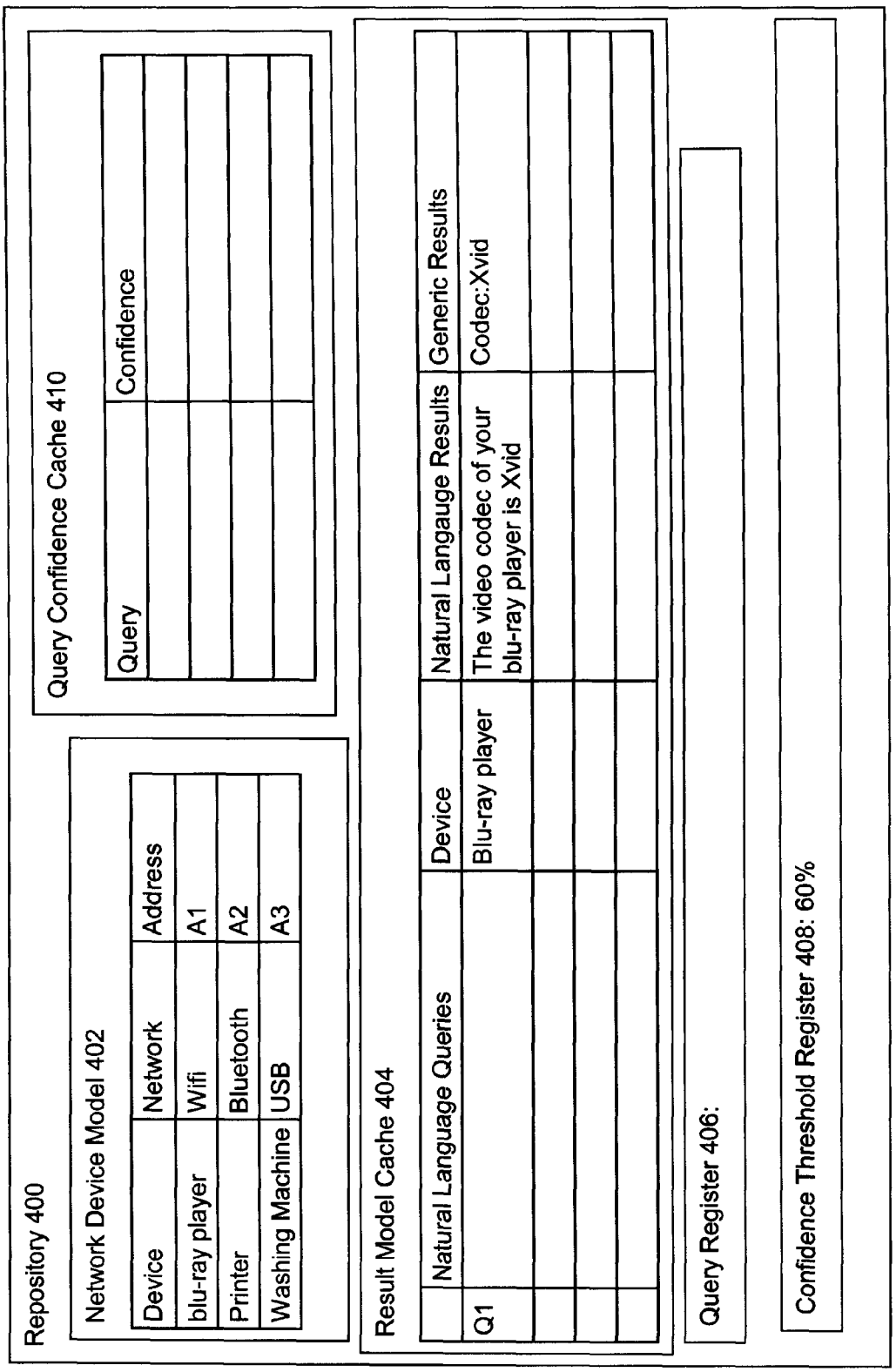

Referring to FIG. 8D, result discovery method 600 parses the generic query result "codec:Xvid" and determines a natural language result "the video codec of your Blu-ray player is Xvid" for query Q1.

Figure 8E:
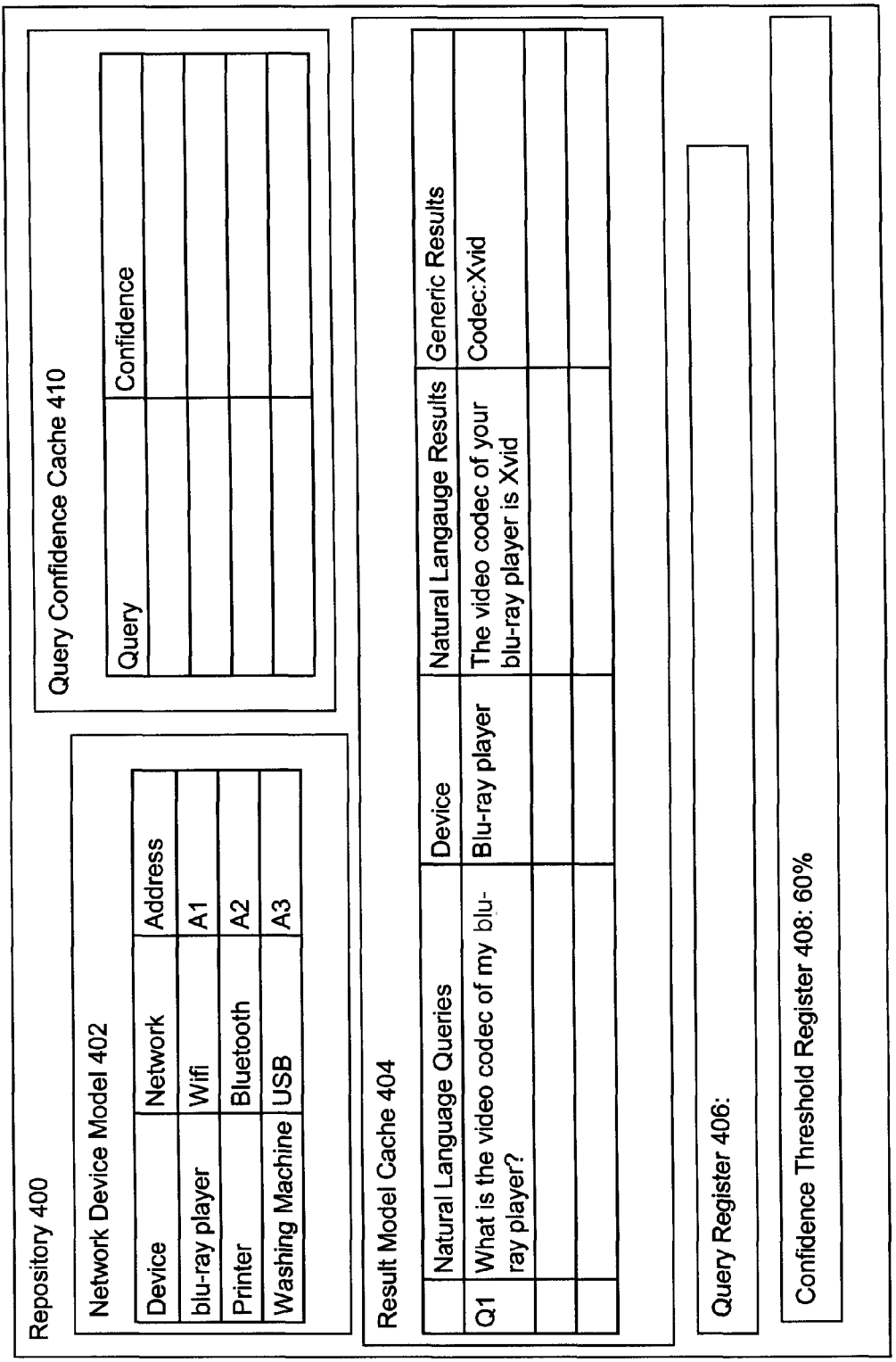

Referring to FIG. 8E, result discovery method 600 determines a natural language query "what is the video codec of my-Blu-ray player" for the natural language result "the video codec of your Blu-ray player is Xvid".

Figure 8F:
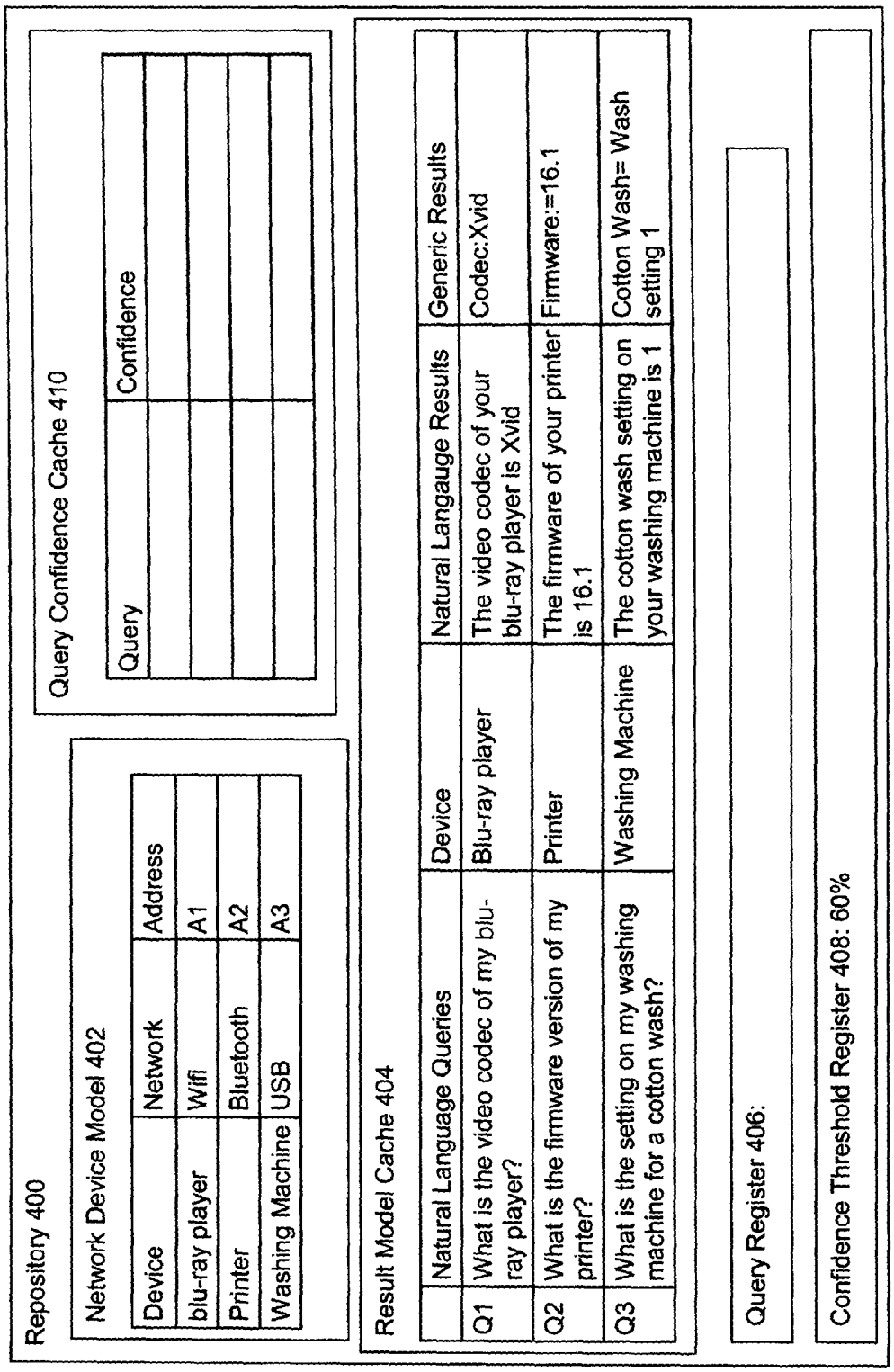

Referring to FIG. 8F, result discovery method 600 determines further natural language queries and results. Query Q2 has a natural language query of "What is the firmware version of my printer" and a natural language result of "The firmware of your printer is 16:1" for a received result of "Firmware:=16:1". Query Q3 has a natural language query of "What is the setting on my washing machine for a cotton wash" and a natural language result of "The cotton wash setting on your washing machine is 1" for a received result of "Cotton Wash=Wash setting 1".

Referring to FIG. 8G, query register 406, receives an intercepted query "What is the codec version for my Blu-ray machine?"

Referring to FIG. 8H, confidence values are calculated for the three possible queries Q1, Q2, Q3 in the result model cache 404 based on the query in the query register 406. Query Q1 has the highest confidence 90% because the wording of the determined natural language query is most similar to the user's query. Query Q2 has a confidence of 20% because there was some similarity between the determined query and the user query. Query Q3 has a confidence of 10% because there is little similarity.

Referring to FIGS. 9A to 9E, states of an example graphical user interface during an example operation of the preferred embodiment are described. The example graphical user interface is network browser 900 comprising: controls 902; and browser frame 904.

Controls 902 comprise: browser control 906 and address bar 908.

Browser control 906 provides buttons for minimizing (−); maximizing (□) and closing (X) network browser 900.

Address bar 908 provides: a network address input box; a back button and a forward button. The network address input box allows for a user to enter a server address so that the browser can request content from the server at the address. In this case the server will be the network interception engine. The back and forward buttons allow for navigation backwards and forwards through a series of network addresses.

Browser frame 904 is a frame space for rendering content sent from the server at the network address in the address bar 908.

Figure 9A:
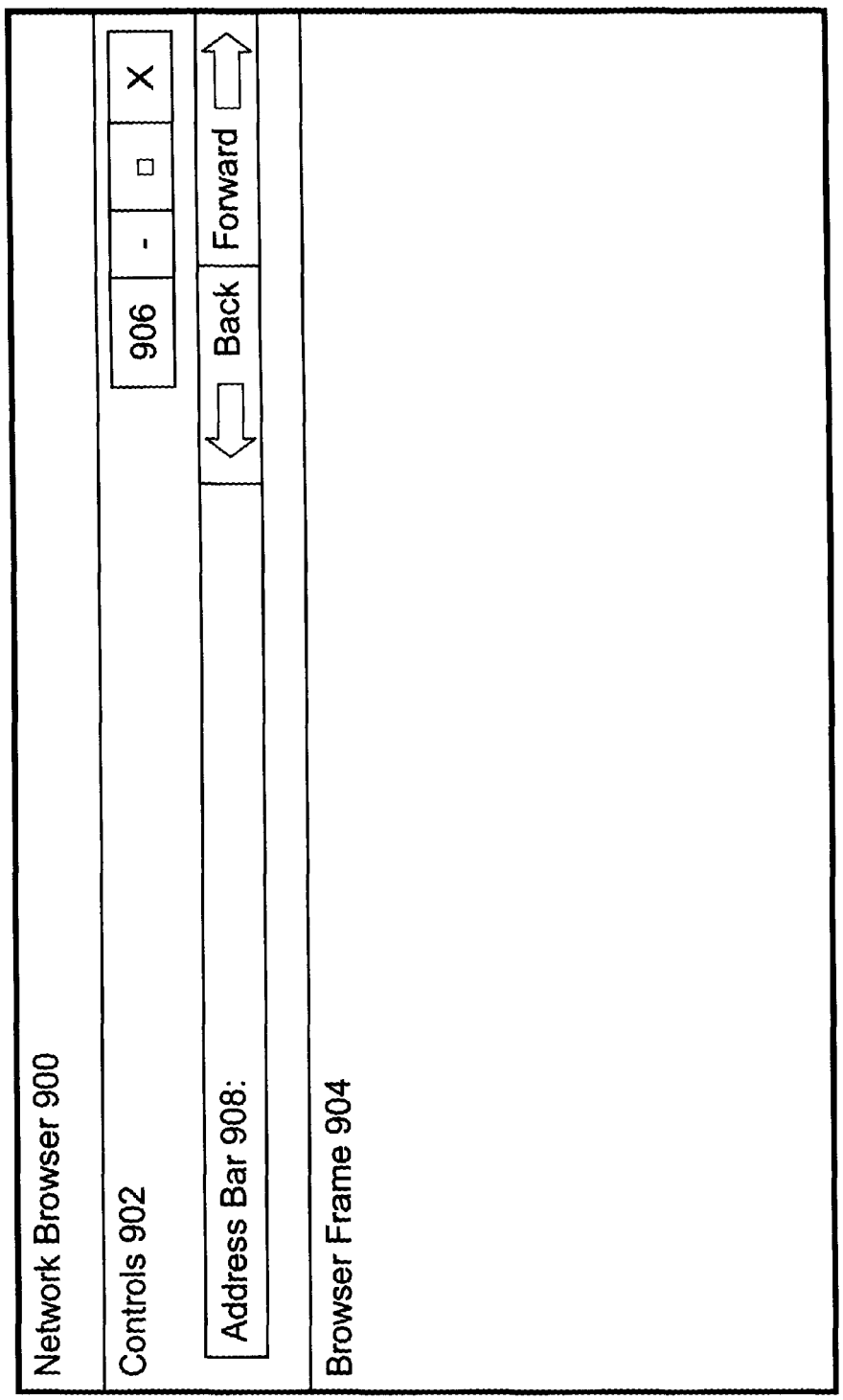
FIGS. 9A to 9F are a series of graphical user interface representations showing the user input and output during the example operation of the preferred embodiment.

Referring to FIG. 9A, network browser 900 is shown empty at startup. No address in entered in address bar 908 and no content displayed in browser frame 904.

Figure 9B:
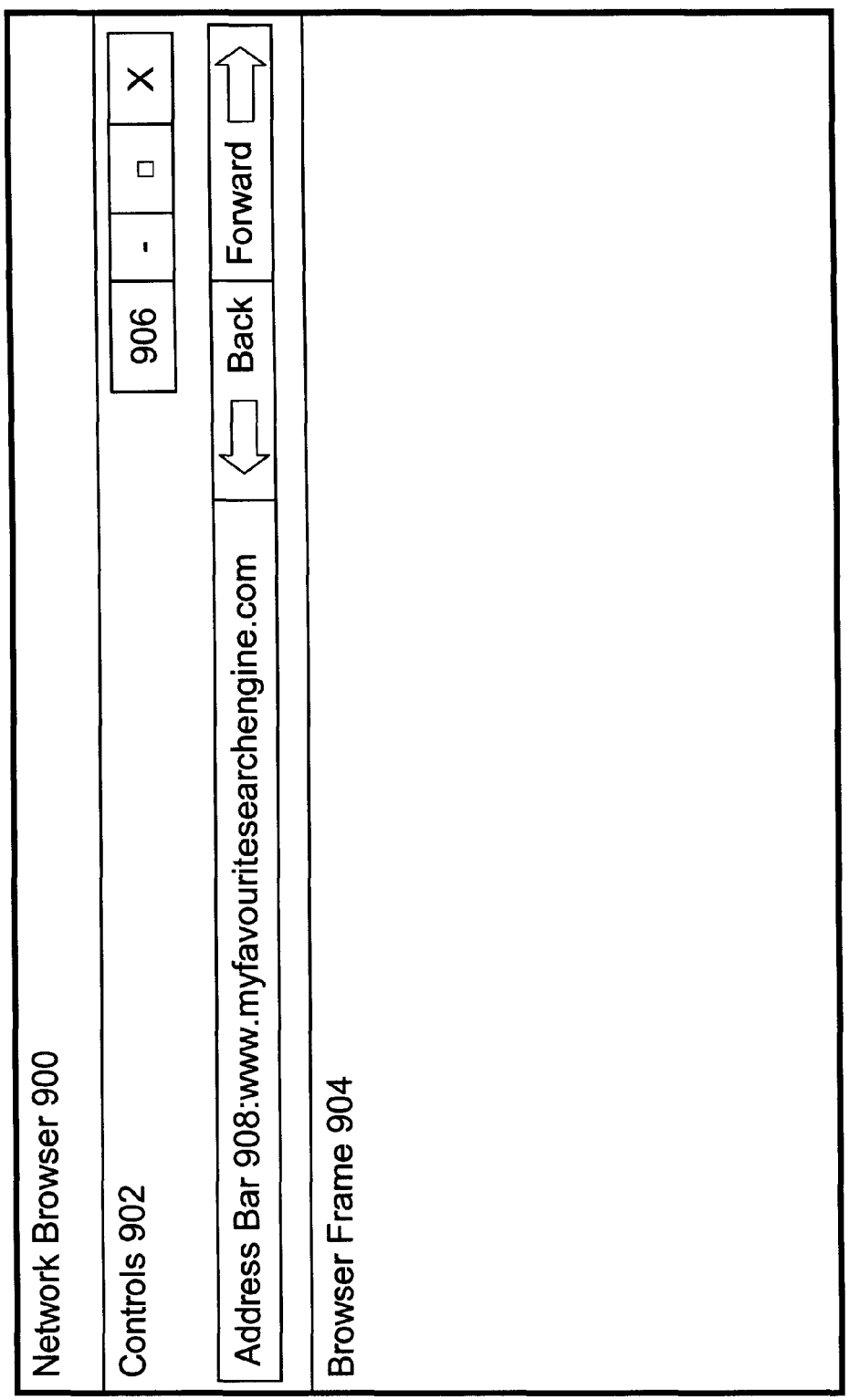

Referring to FIG. 9B, a user has entered "\\www.myfavouritesearchengine.com" into address bar 908 as an address for their favorite search engine. Network browser 900 attempts to request content from that address.

Figure 9C:
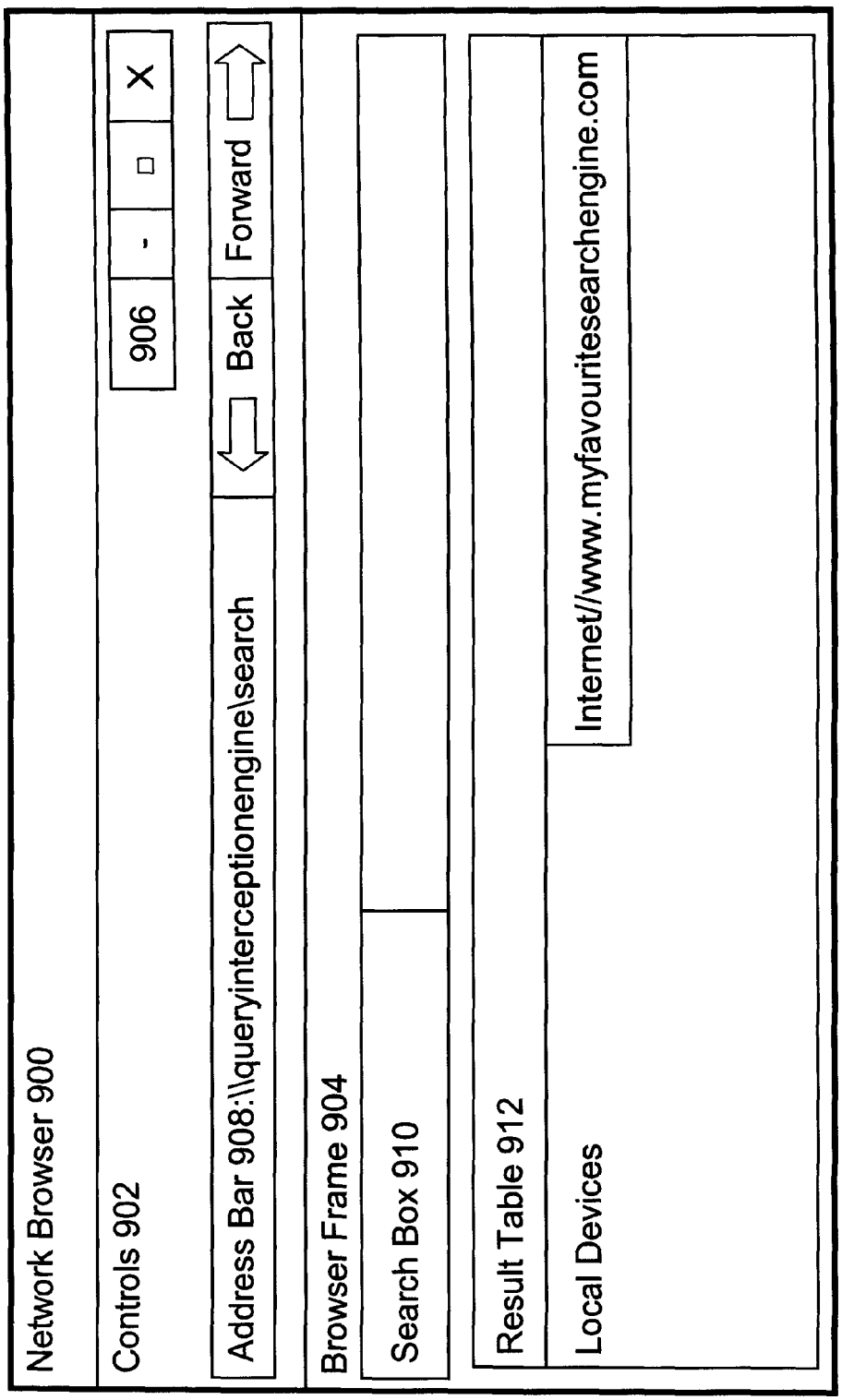

Referring to FIG. 9C, query listener 800 intercepts the search engine request and initiates statement interception method 700 to populate the query confidence cache and send content back for rendering in browser frame 904. The content sent from query interception engine comprises a document containing a search box 910 and result table 912. Initially search box 910 and result table 912 are empty. Search box 910 is adapted to accept input from a user. Result table 912 comprises two tabs: local device tab and Internet tab. Local device tab is for displaying results obtained from local devices. Internet tab is for displaying results obtained from the Internet search (by default the search originally requested by the user). A user selects each tab to display the local device content and the Internet content respectively. An embodiment is envisaged whereby a user enters the address of the query interception engine 300 directly into the address bar so that interception was not needed. In this case a default Internet search engine or series of search engines would be used to provide Internet search results. A further embodiment is envisaged whereby the browser renders the Internet search engine content in one browser tab and opens a new browser tab for the intercept query engine.

Figure 9D:
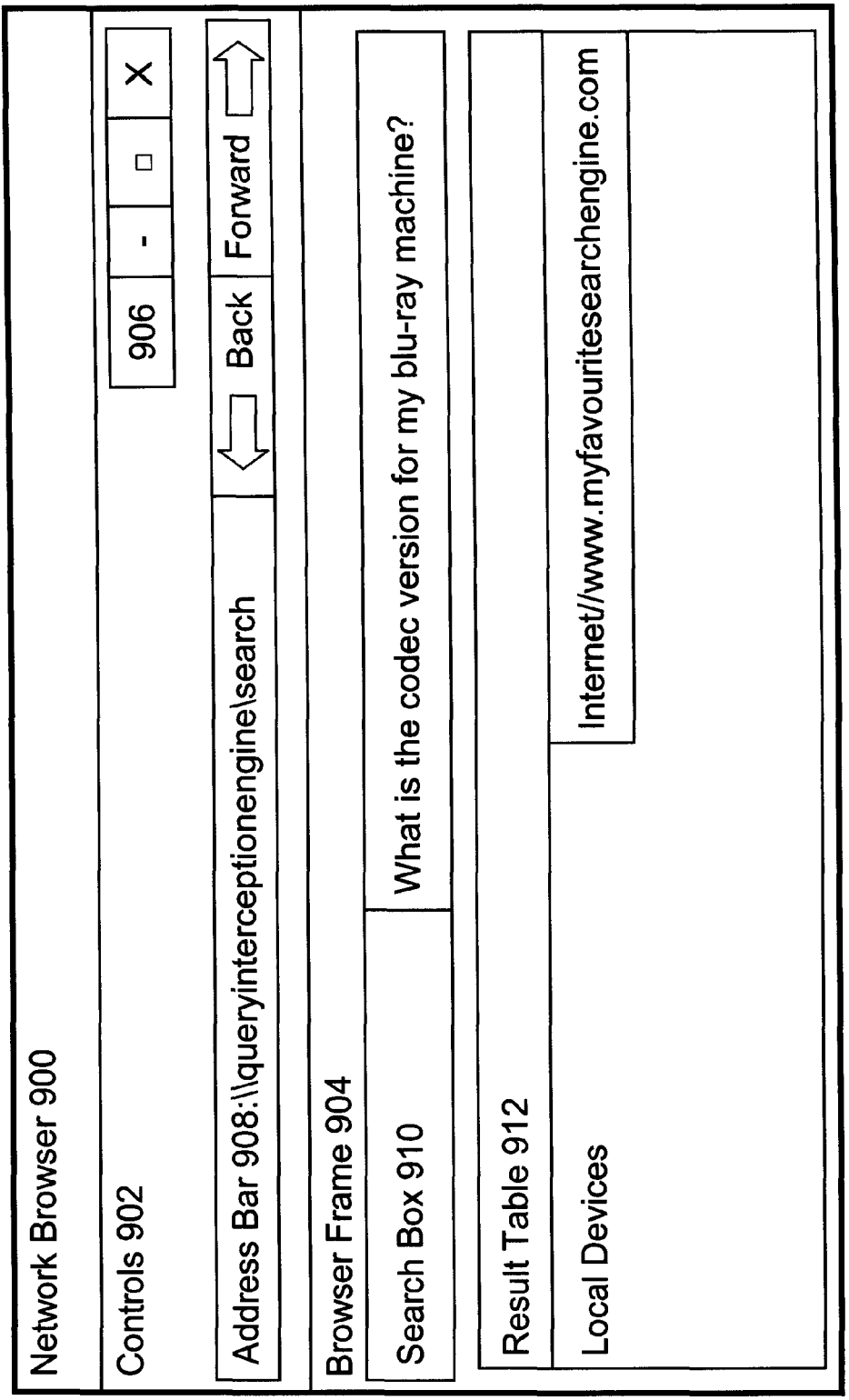

Referring to FIG. 9D, the user has entered search terms into the search box 910 and network browser 900 sends a search query to the query interception engine 300.

Figure 9E:
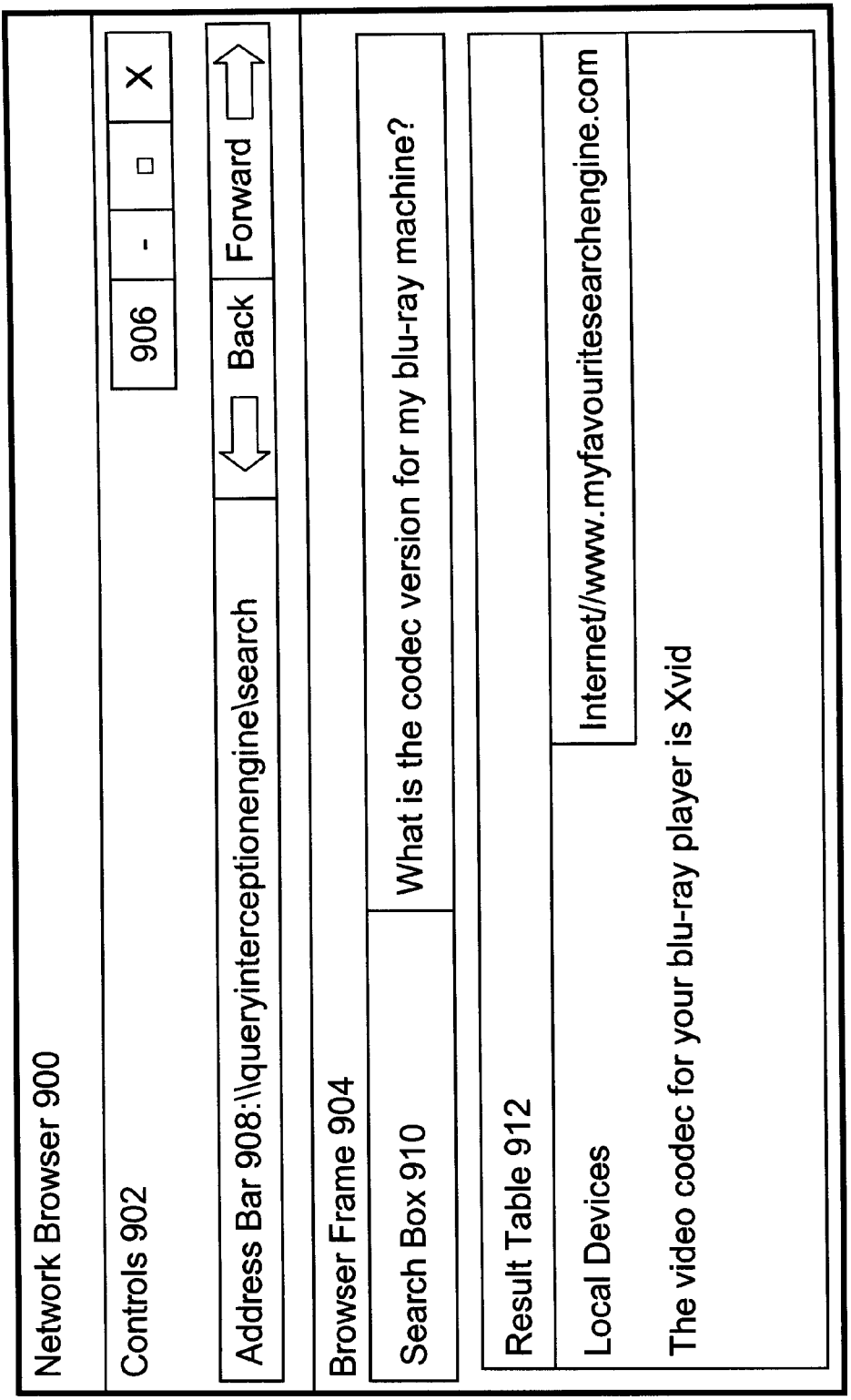

Referring to FIG. 9E, network browser 900 receives content back from query interception engine 300 and displays the local device results in the local devices tab of result table 912.

In this example, one local result has a confidence value above the threshold confidence level: "The video codec for your Blu-ray player is Xvid".

Figure 9F:
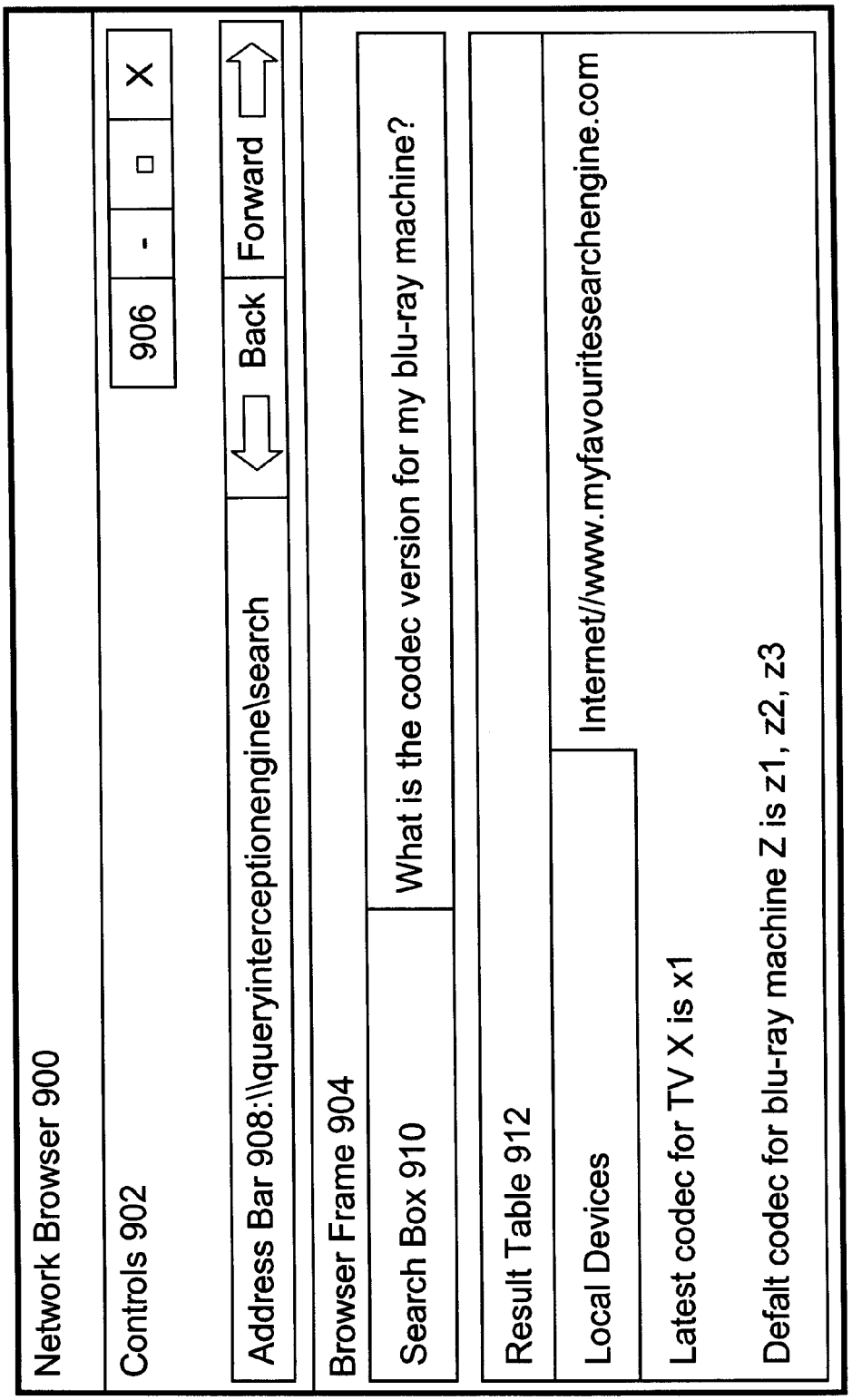

Referring to FIG. 9F, in this example, network browser 900 also receives content back from the Internet search engine and displays the Internet results in the Internet tab of the result table 912. In this example, two Internet results are located that are relevant to the search terms but do not consider the local context: "Latest codec for TV X is x1" and "Default codec for Blu-ray machine Z is z1, z2, z3".

As described herein, in one embodiment of the invention there is provided a method in a system of local network devices for handling a query statement generated by one of the local network devices and destined for a wide area network search engine comprising: determining possible results provided after querying local network devices in the system; intercepting a query statement destined for the wide area network search engine; determining respective relevance values for the possible results provided for the query statement; and returning relevant results from the local network devices in response to the query statement.

In one embodiment the query statement is a search query but other embodiments are envisaged where the query statement is an instruction statement.

The embodiments can direct a query or statement to a device that has been determined as the most likely to provide a relevant result. The embodiments intercept a query and analyze it to determine whether nearby connected devices can provide a more relevant result. If a nearby device is more likely to provide a relevant result to a user's statement then a result from the nearby device is returned.

The embodiments reduce network gateway and external network bandwidth usage as more communication occurs between a client device and local network devices. Reduced wide area network traffic (for example Internet traffic) is particularly important for mobile devices such as mobile phones that incur Internet costs.

The results of the embodiments are more relevant when a locally connected device is able to respond to the user's statement because the locally connected device is aware of the context of the statement.

The various embodiments address local context in a way that a traditional web based search model cannot address.

Questions about products owned by a user could be more reliably answered. For example, a query such as "what video codec does my Blu-ray player support?" would be advantageously answered by the device in question. Similarly "what is the recommended setting for my washing machine for items x, y, z?" would best be answered by the washing machine.

Questions about products not owned by a user could also be answered. For example, "what is the refresh rate on a model ABC TV?" and "what is latest firmware for a model XYZ MP3 Player?" A generic ABC TV might exist for the purpose of answering questions about that particular ABC TV.

Location specific questions could be more reliably answered by devices at that location. For example, what is the temperature in my vicinity? And is the downstairs porch light on?

The above questions illustrate the type of queries that the embodiments perform more relevantly than the traditional web search model. For the first two sets of product related statements, by querying the device first, the device would ideally be aware of its technical specifications and can therefore provide relevant information unlike the Internet which often is unaware of model or location specific differences in the user's hardware. Potentially devices not owned by the user can be located and respond to statements directed at them.

The location specific questions illustrate how the embodiments could be used not only for technical information but for location specific information, such as being able to provide sensor data from sources in the user's surrounding environment effectively an Internet of things.

The embodiments have a physical effect on processes carried on outside the client since the embodiments will reduce the query and statement workload sent externally of the client device.

The embodiments can be implemented at the machine level of a computer and would not affect a computer program executing at the application level.

The embodiments have an effect that results in the computer being made to operate in a new way such that a device for querying can be connected to the local system and become part of the query device network as soon as it is discovered.

The embodiments have an effect leading to an increase in the speed of the overall search since often the local result will be the most relevant and fastest obtained.

The embodiments have an effect leading to an increase in the performance of the client computer since the local result will be the most context relevant result.

Relevance and confidence are used interchangeably throughout the embodiments.

In one embodiment, the method further comprises querying relevant local network devices in response to the intercepted query statement, acquiring an up-to-date result from the network devices; and returning the most up-to-date result from the networked device.

In one embodiment the returned results are cached results from the networked device obtained prior to the intercepted query statement.

In one embodiment, the method further comprises querying the search engine and amalgamating search engine results with the results from the networked device query.

In one embodiment the method further comprises returning only results from the networked devices if a respective relevance value is above a threshold confidence value.

In one embodiment only the results from the networked devices are returned if the search engine query times out.

In one embodiment only the results from the search engine are returned if the networked device query times out.

Suitably a proxy search engine is created and consolidates the search results from the network device and the search engine.

More suitably a new page of search results from the network device is created and kept separate from the search engine results.

Most suitably the search engine is within or outside of the network and the network is a local or enterprise or virtual network.

In one embodiment of the invention there is provided a computer program product for handling a query statement generated by one device of a network of devices and destined for an external system, the computer program product comprising a computer-readable storage medium having computer-readable program code embodied therewith and the computer-readable program code configured to perform the method of any one of appended claims.

Viewed from a further aspect, the present invention provides a method and system substantially as described with reference to the figures.

Further embodiments of the invention are described herein. It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of one or more of the disclosed embodiments may alternatively be embodied fully or partially in a parallel computing system comprising two or more processors for executing parallel software.

It will be clear to one skilled in the art that many improvements and modifications can be made to the foregoing exemplary embodiment without departing from the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For the avoidance of doubt, the term "comprising", as used herein throughout the description and claims is not to be construed as meaning "consisting only of", but rather to mean "including but not limited to".

The invention claimed is:

1. A method for handling a query generated by a user of one of multiple local network devices, wherein the local network devices are coupled to a network, and wherein the method comprises:

identifying, by one or more processors, multiple system queries to local network devices on a network, wherein the multiple system queries are autonomously issued by a computer that is coupled to the network, and wherein the multiple system queries request system states of the local network devices;

intercepting, by one or more processors, multiple query statements from the local network devices to a wide area network search engine, wherein the multiple query statements are in response to the system queries;

generating, by one or more processors, a natural language query from one of the multiple query statements, wherein the natural language query is a logical query that is answered by said one of the multiple query statements;

receiving, by one or more processors, a query from a user to the wide area network search engine, wherein the query from the user is an unstructured query about a state of a particular device from the local network devices; and comparing, by one or more processors, the query from the user with the natural language query to determine if a match between the query from the user with the natural language query exceeds a predetermined threshold value.

2. The method of claim 1, further comprising:
in response to the query from the user matching the natural language query beyond the predetermined threshold value, returning said one of the multiple query statements to the user as a response to the query from the user.

3. The method of claim 1, further comprising:
querying other local network devices on the network;
acquiring updated query statements from the other local network devices; and
returning a most up-to-date query statement from the other local network devices.

4. The method of claim 1, wherein said one of the multiple query statements is a cached result from a local networked device that is obtained prior to said intercepting the multiple query statements.

5. The method of claim 1, further comprising:
creating a proxy search engine, wherein the proxy search engine consolidates the multiple query statements, from the local network devices, with any previous query statements that have been stored in the wide area network search engine for other devices.

6. The method of claim 1, further comprising:
creating a new page of query statements about the local network devices; and
segregating the new page of query statements from query statements, about the local network devices, that are stored in the wide area network search engine.

7. The method of claim 1, wherein the wide area network search engine is outside of the network, and wherein the network is a virtual network.

8. A system for handling a query statement generated by local network devices on a network, the system comprising:
a hardware identification device for identifying multiple system queries to local network devices on a network, wherein the multiple system queries are autonomously issued by a computer that is coupled to the network, and wherein the multiple system queries request system states of the local network devices;
a hardware interception device for intercepting multiple query statements from the local network devices to a wide area network search engine, wherein the multiple query statements are in response to the system queries;
a hardware generation device for generating a natural language query from one of the multiple query statements, wherein the natural language query is a logical query that is answered by said one of the multiple query statements;
a hardware receiver for receiving a query from a user, wherein the query from the user is an unstructured query about a state of a particular device from the local network devices; and
a hardware comparison device for comparing the query from the user with the natural language query to determine if a match between the query from the user with the natural language query exceeds a predetermined threshold value.

9. The system of claim 8, further comprising:
a hardware returning device for, in response to the query from the user matching the natural language query beyond the predetermined threshold value, returning said one of the multiple query statements to the user as a response to the query from the user.

10. The system of claim 8, further comprising:
a hardware query device for querying other local network devices on the network;
a hardware acquisition device for acquiring updated query statements from the other local network devices; and
a hardware returning device for returning a most up-to-date query statement from the other local network devices.

11. The system of claim 8, wherein said one of the multiple query statements is a cached result from a local networked device that is obtained prior to said intercepting the multiple query statements.

12. The system of claim 8, further comprising:
a hardware creation device for creating a proxy search engine, wherein the proxy search engine consolidates the multiple query statements, from the local network devices, with any previous query statements that have been stored in the wide area network search engine for other devices.

13. The system of claim 8, further comprising:
a hardware creation device for creating a new page of query statements about the local network devices; and
a hardware segregation device for segregating the new page of query statements from query statements, about the local network devices, that are stored in the wide area network search engine.

14. The system of claim 8, wherein the wide area network search engine is outside of the network, and wherein the network is a virtual network.

15. A computer program product for handling a query generated by a user of one of multiple local network devices that are coupled to a network, the computer program product comprising a non-transitory computer readable storage medium having program code embodied therewith, the program code readable and executable by a processor to perform a method comprising:
identifying multiple system queries to local network devices on a network, wherein the multiple system queries are autonomously issued by a computer that is coupled to the network, and wherein the multiple system queries request system states of the local network devices;
intercepting multiple query statements from the local network devices to a wide area network search engine, wherein the multiple query statements are in response to the system queries;
generating a natural language query from one of the multiple query statements, wherein the natural language query is a logical query that is answered by said one of the multiple query statements;
receiving a query from a user to the wide area network search engine, wherein the query from the user is an unstructured query about a state of a particular device from the local network devices; and
comparing the query from the user with the natural language query to determine if a match between the query from the user with the natural language query exceeds a predetermined threshold value.

16. The computer program product of claim 15, wherein the program code is further readable and executable by the processor to:
in response to the query from the user matching the natural language query beyond the predetermined threshold value, return said one of the multiple query statements to the user as a response to the query from the user.

17. The computer program product of claim 15, wherein the program code is further readable and executable by the processor to:
query other local network devices on the network;
acquire updated query statements from the other local network devices; and
return a most up-to-date query statement from the other local network devices.

18. The computer program product of claim 15, wherein said one of the multiple query statements is a cached result from a local networked device that is obtained prior to said intercepting the multiple query statements.

19. The computer program product of claim 15, wherein the program code is further readable and executable by the processor to:
create a proxy search engine, wherein the proxy search engine consolidates the multiple query statements, from the local network devices, with any previous query statements that have been stored in the wide area network search engine for other devices.

20. The computer program product of claim 15, wherein the program code is further readable and executable by the processor to:

create a new page of query statements about the local network devices; and segregate the new page of query statements from query statements, about the local network devices, that are stored in the wide area network search engine.

\* \* \* \* \*